H. COLE.
DRAWING TABLE.
APPLICATION FILED MAY 20, 1908.
922,565.
Patented May 25, 1909.
2 SHEETS—SHEET 1.
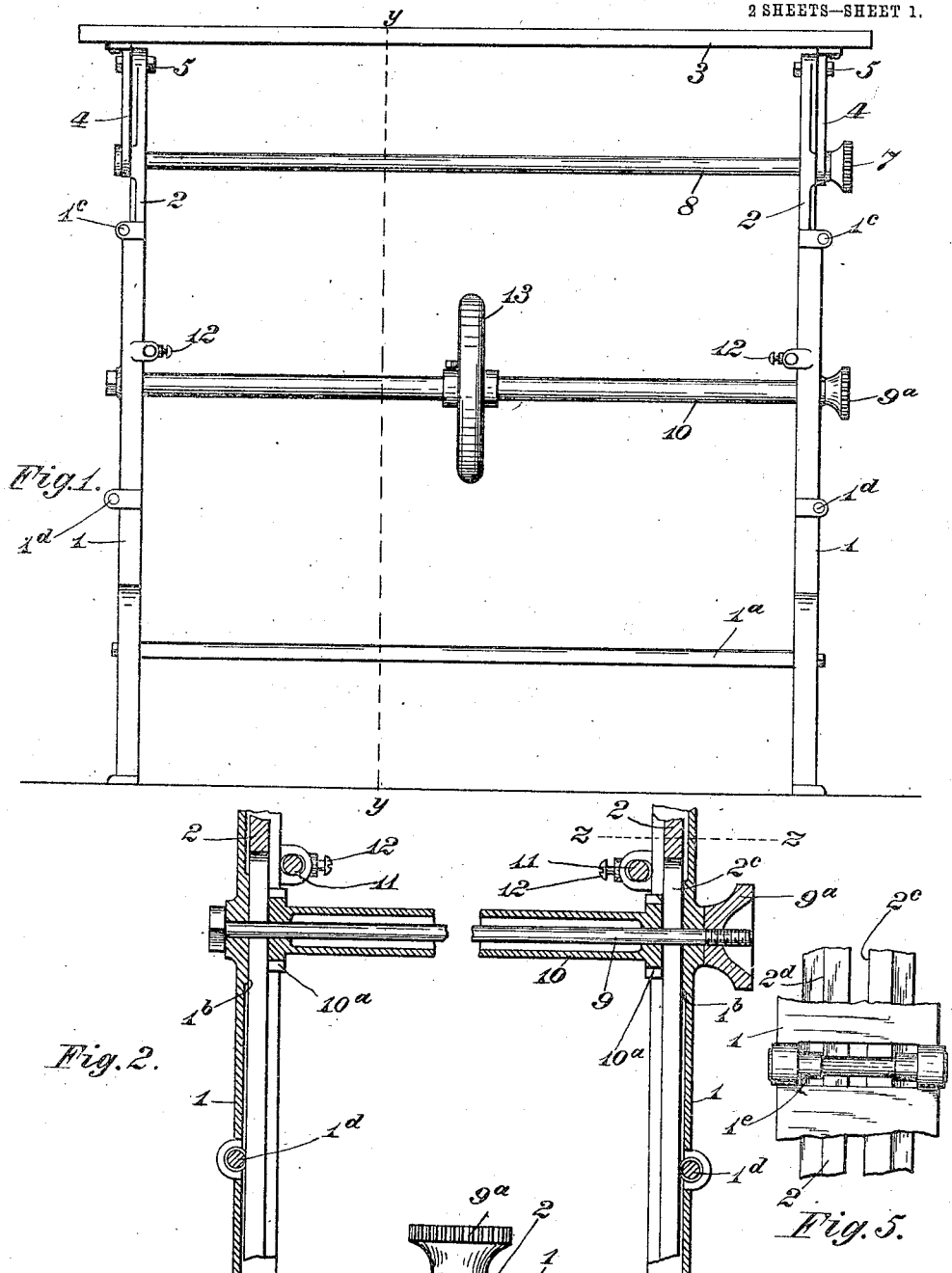
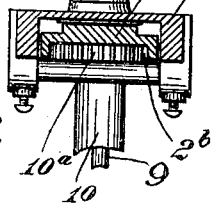
Witnesses
Inventor
Harrison Cole

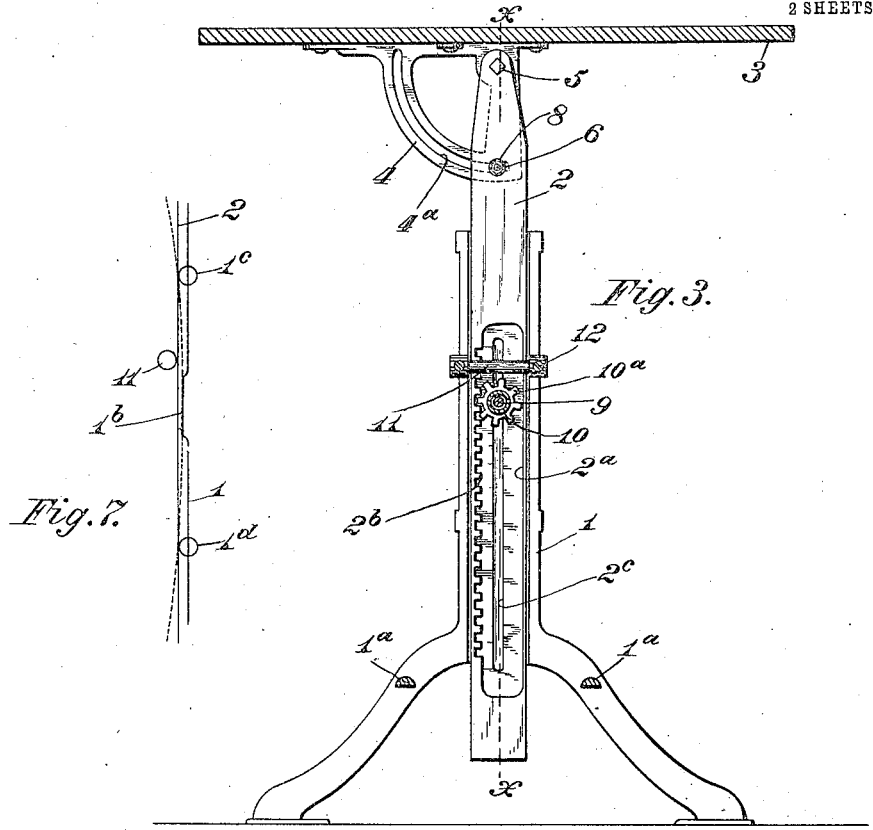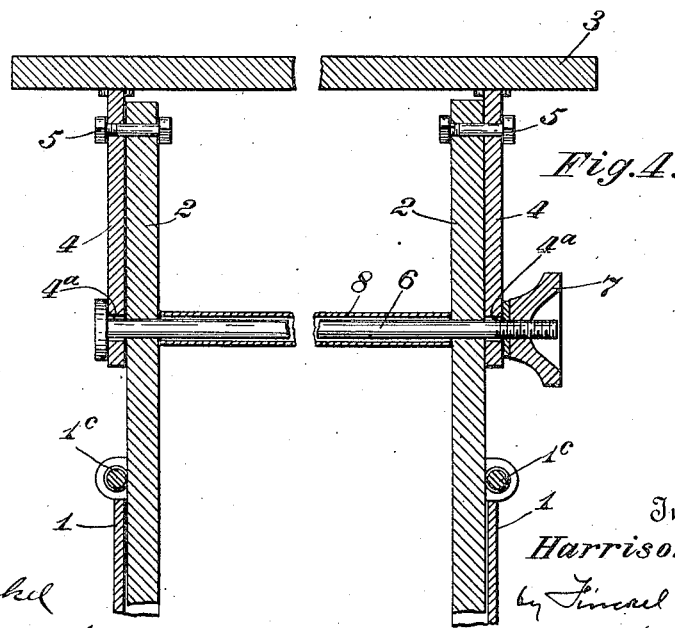

UNITED STATES PATENT OFFICE.

HARRISON COLE, OF COLUMBUS, OHIO.

DRAWING-TABLE.

No. 922,565.  Specification of Letters Patent.  Patented May 25, 1909.

Application filed May 20, 1908. Serial No. 433,910.

*To all whom it may concern:*

Be it known that I, HARRISON COLE, a citizen of the United States, residing at Columbus, in the county of Franklin and State of Ohio, have invented a certain new and useful Improvement in Drawing-Tables, of which the following is a specification.

The object of this invention is to provide an improved drawing table in which the parts are few and simple in construction, and in which the top can be adjusted, that is raised or lowered with greater facility than those heretofore on the market.

The invention is embodied in the construction hereinafter described and claimed, the invention not being confined to the particular instance of it herein illustrated and specifically set forth in connection with such illustration.

In the accompanying drawings—Figure 1 is a front elevation of a drawing table according to the invention; Fig. 2 is a broken sectional detail to illustrate the adjusting and clamping devices, said view being taken on the line $x$—$x$ Fig. 3, looking to the left; Fig. 3 is a vertical section on the line $y$—$y$ Fig. 1 also looking to the left; Fig. 4 is a broken sectional view illustrating the devices for changing the inclination of the top; Fig. 5 is a detail in elevation illustrating the outer anti-friction rollers; Fig. 6 is a horizontal section on the line $z$—$z$ Fig. 2, looking down; Fig. 7 is a diagram illustrating the principle of operation with reference to anti-friction rollers hereinafter described.

In the views 1, 1 designate the supporting or stationary legs held together near their feet by tie bars $1^a$, $1^a$, the front one of which usually affords a convenient foot rest for the draftsman. The inner side of the vertical portion of the stationary legs are of groove form. 2, 2, designate the sliding legs which move in the groove cavities of the stationary legs.

3 designates the table top. The under side of the table top has suitably secured to it a pair of brackets 4, 4, and the table top is hingedly secured to the upper ends of the sliding legs by means of nutted bolts 5, 5, passed through said brackets and the legs and axially alining with each other. The brackets 4, 4 are also provided with slots $4^a$, $4^a$ on arcs concentric with the line of the axis of the hinging bolts referred to. Passed through said slots $4^a$, $4^a$, and the upper ends of the sliding legs is a bolt 6 headed at one end and threaded at the other to receive a nut 7. On the bolt 6 between the legs is a tube 8, the ends of which afford abutments for clamping the brackets 4, 4 against the sliding legs by means of the nut 7 after the desired inclination of the table is obtained.

The inner sides of the sliding legs 2, 2, are longitudinally socketed, as best seen at $2^a$, Fig. 3, and one wall of this socket is made with rack teeth, as seen at $2^b$. Through the leg in said socket portion is a slot $2^c$ extending longitudinally of the leg. Passing through the slots $2^c$ and suitable holes in the stationary legs is a bolt or rod 9 headed on one end and cut with a thread on the other to receive a nut $9^a$. Supported rotarily on the bolt 8 and between the sliding legs is a tube 10 having secured at its ends pinions $10^a$ that mesh with the racks $2^b$. The ends of the tube 10 afford abutments for clamping the sliding legs between them and the stationary legs and the projecting ends of the rod 9 constitute bearings or supports for said tube 10. By loosening said nut the sliding legs and table top are free to be raised or lowered within the limits of the slot, as may be desired. The middle of the tube 10 is furnished rigidly therewith a hand wheel 13 for turning it, so that the pinions $10^a$ may be operated to raise or lower the sliding legs and table top.

The stationary legs at their inner sides where the rod 9 passes through them are each provided with a boss or offset bearing, as seen at $1^b$, $1^b$, Fig. 2, and in each leg are the outer anti-friction rollers $1^c$ and $1^d$ respectively above and below said bosses. These anti-friction rollers are, as best shown in Fig. 5, mounted in suitable bearing ears cast on the stationary legs, and as shown their bearings against the sliding leg are in a vertical plane inwardly slightly beyond the plane of the boss $1^b$. The end portions of the anti-friction rollers are enlarged, as seen at $1^e$, and said enlargements project into rabbet-like corners $2^d$ (see Fig. 5) in the sliding legs 2. Secured in suitable ear bearings projecting from the inner side of the stationary legs above the operating tube 10 is a loosely supported roller bearing 11 with set screws 12 for limiting its movement.

The operation of the said parts is this— When the sliding leg is pinched between the stationary leg and the end of the pinioned tube it is drawn tightly against the two outer rollers $1^c$ and $1^d$ and slightly flexed. This flexing of the sliding leg draws it away from the inner intermediate roller 11. But when the sliding leg is again released, as for adjustment of the table top, the leg springs to straight form and bears against all three anti-friction rollers 1ᶜ, 1ᵈ and 11.

In the diagram, Fig. 7, is illustrated exaggeratedly the principle of operation involved in the construction as to the anti-friction rollers. It will be understood that the full line 2 represents a sliding leg, 1 the stationary leg and 1ᶜ, 1ᵈ and 11 the several anti-friction rollers. In the full line position the leg 2 contacts with all the rollers but when the sliding leg 2 is clamped to the boss of the stationary leg and tightly against the rollers 1ᶜ and 1ᵈ it is flexed away from the roller 11, the broken line indicating flexion but not the actual degree of it in practice. It will be noted also in this construction that the member 10 for operating the sliding legs affords an abutting or opposing device for clamping the stationary and sliding legs together, and that while the draftsman is holding with one hand the operating member 10 with the table adjusted to the proper height it is a simple matter to tighten up the nut 9 with the other hand. It will be further noted that there is no likelihood of the parts sticking and that they are freely operative at any time.

What I claim and desire to secure by Letters Patent is:

1. In a drawing table, the combination with the table top, of sliding legs therefor, stationary legs in which said sliding legs slide, two roller bearings mounted on each stationary leg at one side of the corresponding sliding leg, means intermediate said roller bearings for clamping said sliding leg against the corresponding bearings, and a third roller bearing mounted on each stationary leg at the opposite side of the sliding leg, substantially as described.

2. In a drawing table, the combination with the table top, of sliding legs therefor, stationary legs in which said sliding legs slide, two roller bearings mounted on each stationary leg at one side of the corresponding sliding leg, means intermediate said roller bearings for clamping the sliding leg against said bearings, and a third roller bearing adjustably mounted on the stationary leg at the opposite side of the sliding leg so that it may be adjusted to such position with respect to the surface of said sliding leg that it will come in contact therewith when the clamping means is released, substantially as described.

3. In a drawing table, the combination with the table top, of sliding legs therefor, stationary legs in which said sliding legs slide, separated bearings in each stationary leg at one side of the corresponding sliding leg, means intermediate said separated bearings for clamping the sliding legs against said bearings, and a roller bearing mounted in each stationary leg at the opposite side of the sliding leg in such position with respect to the surface of said sliding leg that the leg will come in contact with the roller bearing when the clamping means is released, substantially as described.

4. In a drawing table, the combination with the table top, of sliding legs therefor, stationary legs in which said sliding legs slide, separated bearings in each stationary leg at one side of the corresponding sliding leg, means intermediate said separated bearings for clamping the sliding legs against said bearings, and a roller bearing adjustably mounted in the stationary leg at the opposite side of the sliding leg so that it may be adjusted to such position with respect to the surface of said sliding leg that said leg will come in contact with the roller bearing when the clamping means is released, substantially as described.

5. In a drawing table, the combination with the table top, of sliding legs thereon having rack teeth, stationary legs in which said sliding legs slide, a tube 10 supported in the stationary legs and between the sliding legs, said tube provided with pinions to engage the teeth of the sliding legs for operating said legs, offset bearings 1ᵇ in the stationary legs, roller bearings mounted on each stationary leg above and below the said offset bearing therein, and means for clamping each sliding leg between the corresponding end of the tube and said roller bearings and offset bearing in the corresponding stationary leg, substantially as described.

HARRISON COLE.

Witnesses:
GEO. M. FINCKEL,
BENJAMIN FINCKEL.